(12) United States Patent
Singh et al.

(10) Patent No.: US 11,200,261 B2
(45) Date of Patent: Dec. 14, 2021

(54) SYSTEM AND METHOD FOR RETRIEVING DATA RECORDS

(71) Applicant: Innoplexus AG, Eschborn (DE)

(72) Inventors: Vivek Singh, Pune (IN); Mukesh Mehta, Delhi (IN); Vatsal Agarwal, Rampur (IN); Ashwin Rathod, Hardap (IN)

(73) Assignee: Innoplexus AG, Eschborn (DE)

( * ) Notice: Subject to any disclaimer, the term of this patent is extended or adjusted under 35 U.S.C. 154(b) by 240 days.

(21) Appl. No.: 16/525,931

(22) Filed: Jul. 30, 2019

(65) Prior Publication Data
US 2021/0034646 A1   Feb. 4, 2021

(51) Int. Cl.
*G06F 7/00* (2006.01)
*G06F 16/28* (2019.01)
*G06F 16/245* (2019.01)
*G06F 16/23* (2019.01)

(52) U.S. Cl.
CPC ........ *G06F 16/285* (2019.01); *G06F 16/2365* (2019.01); *G06F 16/245* (2019.01)

(58) Field of Classification Search
CPC .. G06F 16/285; G06F 16/245; G06F 16/2365; G05F 16/248

USPC ................................................. 707/600–899
See application file for complete search history.

(56) References Cited

U.S. PATENT DOCUMENTS

2007/0174270 A1* 7/2007 Goodwin .............. G06F 16/951

* cited by examiner

*Primary Examiner* — Isaac M Woo
(74) *Attorney, Agent, or Firm* — Ziegler IP Law Group, LLC

(57) ABSTRACT

Disclosed is a system for retrieving data records from database arrangement based on search query. The database arrangement comprises plurality of data records that are associated with at least one concept. The system comprises ontological databank and processing arrangement. The ontological databank comprises plurality of concept buckets comprising plurality of concepts. The ontological databank is structured using structuring arrangement communicably coupled to ontological databank. The structuring arrangement comprises classification module to classify plurality of concepts, variant module to generate lexical variants of plurality of concepts, and normalization module to determine validity of plurality of concepts and association of new concept with one of plurality of concept buckets. The processing arrangement is operable to receive search query, process search query based on ontological databank, retrieve data records from database arrangement based on processed search query, and provide retrieved data records on computing device.

13 Claims, 2 Drawing Sheets

SYSTEM AND METHOD FOR RETRIEVING DATA RECORDS

TECHNICAL FIELD

The present disclosure relates generally to context-based retrieval of data records and more specifically, to systems for retrieving data records from a database arrangement based on a search query. Moreover, the present disclosure relates to methods for retrieving data records. Furthermore, the present disclosure is also related to computer program products comprising non-transitory computer-readable storage media having computer-readable instructions stored thereon, the computer-readable instructions being executable by a computerized device comprising processing hardware to execute aforementioned methods.

BACKGROUND

With advancements in digital technology, majority of information is shared in the form of digital data or digital content stored in documents (referred to herein as data records). Specifically, the data records are stored in different storage mediums namely, hardware, software, or a combination thereof. Notably, the storage mediums comprise plurality of data records pertaining to a specific domain and/or field. For example, in a database relating to the domain of automobiles a plurality of documents may be available on types of automobiles, available models, capacity of different automobiles, automobile brands and the like. Consequently, data records may also be assigned to the specific types of automobiles therein. Furthermore, the storage mediums may contain plurality of data records pertaining to multiple domains and/or fields.

Generally, users retrieve data records from the storage mediums like archives by providing search terms therein. The search terms closely represent terms used in the specific field of interest for which the search is being performed. For example, a user may provide the search term as 'electric vehicles' to identify electric four wheelers available in a specific region; a user may provide 'cancer treatment' as the search term to identify treatment centers for the same etc. However, the data records available in the archives are not categorized based on their relevance and/or importance to the search terms. Thus, data records retrieved on the basis of the search terms may generate various redundant results as well. As a result, the user will have to manually distinguish relevant documents from the redundant ones. Thus, making it a time-consuming and laborious process.

Furthermore, the search terms provided by the user may not be an exact copy of the terms used in the data records. Notably, it may be a generic interpretation of the same. Alternatively, it may be a commonly known variation of the term. For example, the term 'Colorectal Cancer' is also addressed as 'CRC', similarly the term 'Cinqair' is a common name for asthma drug 'Reslizumab'. As a result, based on such variations of the search terms, the search engines searching data records on storage mediums may fail to interpret the search terms appropriately. Additionally, existing systems used for retrieving data records from storage mediums do not merge variations of the search terms and alternates of the search terms while interpreting the search terms. Thereby, decreasing coverage of the search terms and/or rendering the storage mediums obsolete.

Therefore, in light of the foregoing discussion, there exists a need to overcome the aforementioned drawbacks associated with retrieving accurate data records from storage mediums.

SUMMARY

The present disclosure seeks to provide a system for retrieving data records. The present disclosure also seeks to provide a method for retrieving data records. The present disclosure seeks to provide a solution to the existing problem of inefficient search engines and unstructured data storage systems. An aim of the present disclosure is to provide a solution that overcomes at least partially the problems encountered in prior art, and provides data records retrieved by mapping accurate concepts, thereby enhancing computational efficiency.

In one aspect, an embodiment of the present disclosure provides a system for retrieving data records from a database arrangement based on a search query, the database arrangement comprising a plurality of data records, wherein each of the plurality of data records is associated with at least one concept, the system comprising
  an ontological databank comprising a plurality of concept buckets, wherein a given concept bucket comprises a plurality of concepts that are synonyms of each other, wherein the ontological databank is structured using a structuring arrangement communicably coupled to the ontological databank, the structuring arrangement comprising
    a classification module operable to classify each of the plurality of concepts in each of the plurality of concept buckets into a specific category or a generic category;
    a variant module operable to generate lexical variants of the plurality of concepts in the plurality of concept buckets; and
    a normalization module operable to determine validity of the plurality of concepts in each of the plurality of concept buckets, and validity of association of a new concept with one of the plurality of concept buckets;
  a processing arrangement communicably coupled to the database arrangement and the ontological databank, the processing arrangement operable to
    receive a search query;
    process the search query based on the ontological databank;
    retrieve data records from the database arrangement based on the processed search query; and
    provide the retrieved data records on a computing device.

In another aspect, an embodiment of the present disclosure provides a method for retrieving data records from a database arrangement based on a search query, the database arrangement comprising a plurality of data records, wherein each of the plurality of data records is associated with at least one concept, wherein the method is implemented using a system comprising
  an ontological databank comprising a plurality of concept buckets, wherein a given concept bucket comprises a plurality of concepts that are synonyms of each other, wherein the ontological databank is structured using a structuring arrangement communicably coupled to the ontological databank, the structuring arrangement comprising a classification module operable to classify each of the plurality of concepts in each of the plurality of concept buckets into a specific category or a generic category;

a variant module operable to generate lexical variants of a plurality of concepts in the plurality of concept buckets; and a normalization module operable to determine validity of the plurality of concepts in each of the plurality of concept buckets, and validity of association of a new concept with one of the plurality of concept buckets;

a processing arrangement communicably coupled to the database arrangement and the ontological databank;

wherein the method comprises receiving a search query;

processing the search query based on the ontological databank;

retrieving data records from the database arrangement based on the processed search query; and providing the retrieved data records on a computing device.

In yet another aspect, an embodiment of the present disclosure provides a computer program product comprising non-transitory computer-readable storage media having computer-readable instructions stored thereon, the computer-readable instructions being executable by a computerized device comprising processing hardware to execute an aforesaid method.

Embodiments of the present disclosure substantially eliminate or at least partially address the aforementioned problems in the prior art, and enables a dynamic and efficient system to retrieve data records.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
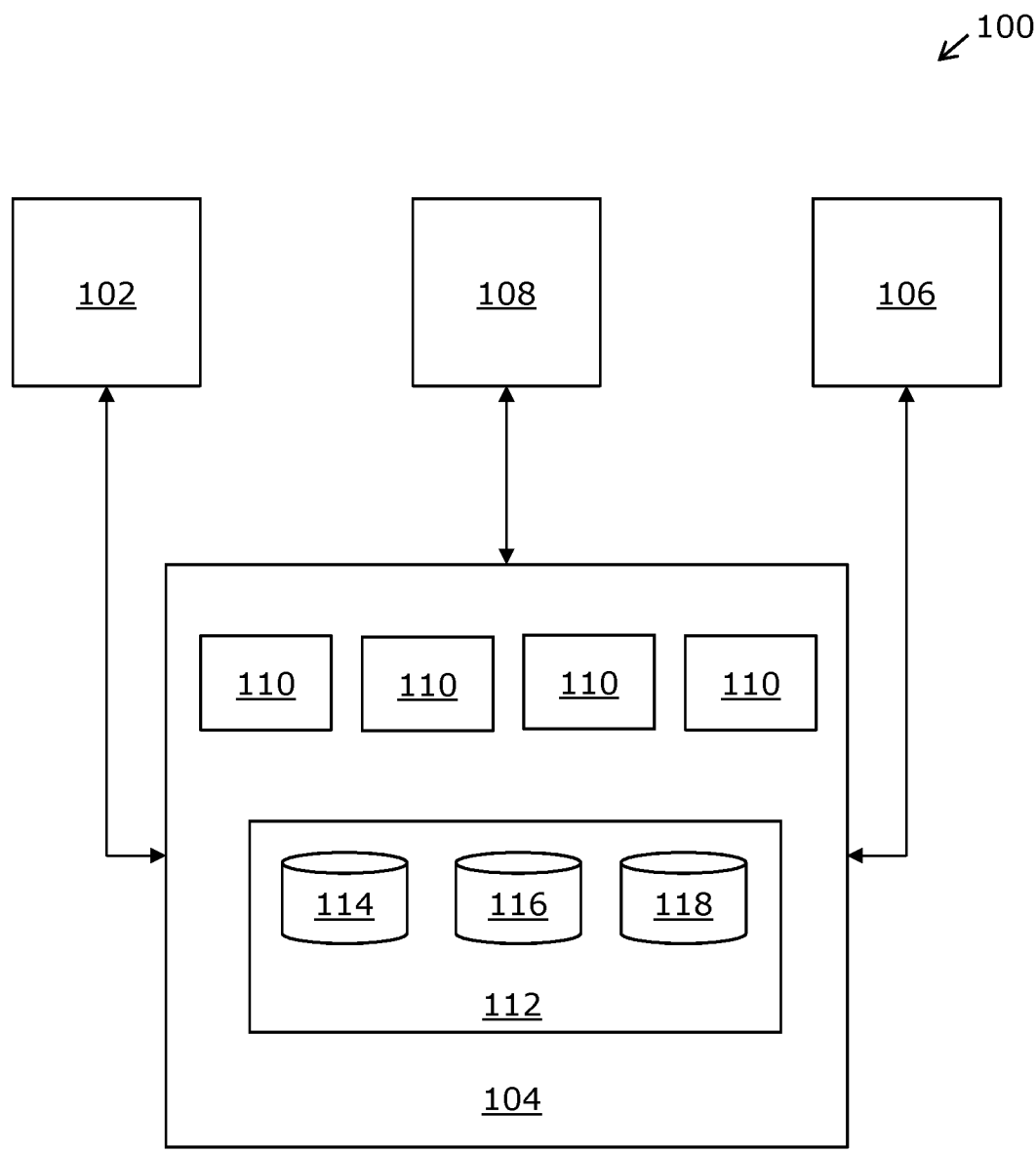
FIG. 1 is a schematic illustration of a system for retrieving data records from a database arrangement based on a search query, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for retrieving data records from a database arrangement based on a search query, the database arrangement comprising a plurality of data records, wherein each of the plurality of data records is associated with at least one concept, the system comprising an ontological databank comprising a plurality of concept buckets, wherein a given concept bucket comprises a plurality of concepts that are synonyms of each other, wherein the ontological databank is structured using a structuring arrangement communicably coupled to the ontological databank, the structuring arrangement comprising a classification module operable to classify each of the plurality of concepts in each of the plurality of concept buckets into a specific category or a generic category;

a variant module operable to generate lexical variants of the plurality of concepts in the plurality of concept buckets; and a normalization module operable to determine validity of the plurality of concepts in each of the plurality of concept buckets, and validity of association of a new concept with one of the plurality of concept buckets;

a processing arrangement communicably coupled to the database arrangement and the ontological databank, the processing arrangement operable to receive a search query;

process the search query based on the ontological databank;

retrieve data records from the database arrangement based on the processed search query; and provide the retrieved data records on a computing device.

In another aspect, an embodiment of the present disclosure provides a method for retrieving data records from a database arrangement based on a search query, the database arrangement comprising a plurality of data records, wherein each of the plurality of data records is associated with at least one concept, wherein the method is implemented using a system comprising an ontological databank comprising a plurality of concept buckets, wherein a given concept bucket comprises a plurality of concepts that are synonyms of each other, wherein the ontological databank is structured using a structuring arrangement communicably coupled to the ontological databank, the structuring arrangement comprising a classification module operable to classify each of the plurality of concepts in each of the plurality of concept buckets into a specific category or a generic category;

a variant module operable to generate lexical variants of the plurality of concepts in the plurality of concept buckets; and a normalization module operable to determine validity of the plurality of concepts in each of the plurality of concept buckets, and validity of association of a new concept with one of the plurality of concept buckets;

a processing arrangement communicably coupled to the database arrangement and the ontological databank; wherein the method comprises receiving a search query;

processing the search query based on the ontological databank;

retrieving data records from the database arrangement based on the processed search query; and providing the retrieved data records on a computing device.

The present disclosure provides data records retrieved from the database arrangement based on search query provided by the user. Specifically, the system maps concepts in the search query to plurality of concepts in multiple data records to extract most relevant data thereby. Beneficially, the system described herein identifies concepts from even variations of the search query terms thus surveying a plurality of data records referred therein to retrieve the most relevant data records.

As mentioned previously, the system retrieves data records from the database arrangement based on the search query. The database arrangement comprises the plurality of data records, wherein each of the plurality of data records is associated with at least one concept. Throughout the present disclosure, the term "plurality of data records" refers to a set of files in which information is recorded. Typically, the information is recorded as a data type. Some examples of various data types are text data, tabular data, image data, and so forth. Thus, data records may be in any suitable file format depending upon the data type in which the information is recorded. Moreover, the plurality of data records further comprise associated attributes that relate to structural information thereof. In an example, the associated attribute may include a structure relating to the plurality of data records such as a layout of the document, a design of the document, and so forth. In another example, the associated attributes may include a format relating to the plurality of data records, such as font, color, image, and so forth.

Furthermore, each of the plurality of data records comprises one or more sentences. Typically, the one or more sentences in each of the plurality of data records refers to a basic unit of language that expresses a complete idea. The subject matter expressed by the one or more sentences relates to the subject matter or the domain associated with the document. In other words, the one or more sentences contained in a given documents conveys a brief description relating to the subject area or the domain associated with the given document. Additionally, the one or more sentences follow grammatical rules and syntaxes for formation thereof. Thus, each of the plurality of data records adheres to a subject matter and/or a domain associated therewith. Furthermore, the plurality of data records contains relevant information on concepts, categories and so forth in the specific domain. In an embodiment, plurality of data records may elaborate on a single concept therein. In another embodiment, plurality of data records may address multiple concepts in a domain. More optionally, each of the plurality of data records may be saved as a uniquely named file in one or more databases. Additionally, the plurality of data records may be stored in the database arrangement.

For instance, in the domain of healthcare, there may be plurality of data records in the database arrangement addressing multiple concepts pertaining to different types of diseases, symptoms of a disease, treatment stages of a disease, renowned hospitals, chemical composition of medicines etc. Similarly, in the domain of history, there may be plurality of data records pertaining to history of the world, history of a country, history of an ethnic group and the like. Notably, a user provides search query related to the concept in the specific domain thereof. Typically, information may be available in at least one data record and/or plurality of data records.

Throughout the present disclosure, the term "database arrangement" as used herein, refers to an organized body of digital information, regardless of the manner in which the data or the organized body thereof is represented. Optionally, the database may be hardware, software, firmware and/or any combination thereof. For example, the organized body of related data may be in the form of a table, a map, a grid, a packet, a datagram, a file, a document, a list or in any other form. The database includes any data storage software and systems, such as, for example, a relational database like IBM DB2 and Oracle 9. Optionally, the database arrangement comprises one or more databases therein.

The system comprises the processing arrangement communicably coupled to the database arrangement and the ontological databank. The processing arrangement is communicably coupled to the database arrangement and the ontological databank. Throughout the present disclosure, the term "processing arrangement" refers to an arrangement of one or more servers that includes one or more processors configured to perform various operations, for example, as mentioned earlier. Optionally, the processing arrangement includes any arrangement of physical or virtual computational entities capable of performing the various operations. The term "one or more processors" may refer to one or more individual processors, processing devices and various elements associated with a processing device that may be shared by other processing devices.

Additionally, the one or more individual processors, processing devices and elements are arranged in various architectures for responding to and processing the instructions that drive the aforesaid system. Moreover, it will be appreciated that the processing arrangement is implemented by way of a single hardware server. The processing arrangement may alternatively be implemented by way of a plurality of hardware servers operating in a parallel or distributed architecture. As an example, the processing arrangement may include components such as memory, a processor, a network adapter and the like, to store and process information pertaining to the document and to communicate the processed information to other peripheral components, for example, such as a computing device.

Furthermore, a communication module exists between the processing arrangement and the database arrangement and the ontological databank. Throughout the present disclosure, the term "communication module" relates to an arrangement of interconnected programmable and/or non-programmable components that are configured to facilitate data communication between one or more computing devices, software modules and/or databases, whether available or known at the time of filing or as later developed. Additionally, the communication module includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, although the system is frequently described herein as being implemented with TCP/IP communication protocols, the system may also be implemented using IPX, Appletalk, IP-6, NetBIOS, OSI, any tunneling protocol (e.g. IPsec, SSH), or any number of existing or future protocols. Furthermore, any other suitable protocols using voice, video, data, or combinations thereof, can also be employed.

The processing arrangement is operable to receive the search query. The term "search query" as used herein, relates to input text provided by the user in order to extract information in the form of data records. Specifically, the search query can be a word or a combination of one or more words to form a significant sentence representing the search query. Additionally, the search query indicates the specific domain of interest of the user. Moreover, the extracted search results may have information related to the terms present in the search query therein. Additionally, the search query is in text format. Optionally, the search query may be provided using a command prompt (cmd), user-interface (UI) and so forth. More optionally, the search query may be provided in an image format, an audio input and the like. Furthermore, search query may be a string of words and/or an alpha-numeric combination closely representing information related to concepts contained in the data record searched by the user.

Optionally, the search query is received from the computing device associated with the user. Generally, the computing device relates to an electronic device associated with (or used by) the user that is capable of enabling the user to perform specific tasks associated with the aforementioned system/method. Furthermore, the computing device is intended to be broadly interpreted to include any electronic device that may be used for voice and/or data communication over a wired and/or wireless communication network. Examples of computing device include, but are not limited to, cellular phones, personal digital assistants (PDAs), handheld devices, wireless modems, laptop computers, personal computers, etc. Additionally, the computing device includes a casing, a memory, a processor, a network interface card, a microphone, a speaker, a keypad, and a display. Moreover, the computing device is to be construed broadly, so as to encompass variety of different types of mobile stations, subscriber stations or, more generally, communication devices, including examples such as combination of a data card inserted in a laptop; combination of a microphone inserted in a cellular phone and the like. Such computing devices are also intended to encompass devices commonly referred to as access terminals.

It will be appreciated that the computing device provides a user-interface to the user to enter the search query. User-interface (UI) relates to a structured set of user-interface elements rendered on a display screen of the computing device. Optionally, the user-interface (UI) rendered on the display screen is generated by any collection or set of instructions executable by an associated computing device. Additionally, the user-interface (UI) is operable to interact with the user to convey graphical and/or textual information and receive input/search query from the user.

Optionally, the user-interface (UI) used herein may be a graphical user-interface (GUI). Furthermore, the user-interface (UI) elements refer to visual objects that have a size and position in the user-interface (UI). A user-interface element may be visible, though there may be times when the user-interface element is hidden or overlaid on other user-interface elements. Examples of user-interface elements may include, but are not limited to, text blocks, input area, labels, text boxes, list boxes, lines, images windows, dialog boxes, frames, panels, menus, buttons, icons. In addition to size and position, user-interface element may have other properties, such as a margin, spacing, and the like.

The processing arrangement is operable to process the search query based on the ontological databank. It will be appreciated that a given domain comprises a set words relating to concepts, categories, and so forth of the given domain. Typically, an ontological databank defines properties associated with the set of words and relations therebetween in the given domain. It will be appreciated that the term ontological databank relates to a set of concepts (namely, information, ideas, data, semantic associations and so forth) in the domain (namely, subject matter, field and so forth) that details types and properties of the set of concepts and semantic association thereof. Furthermore, ontological databank provides a base for performing search to extract information in the form of data records pertaining to the domain of interest of the user.

Moreover, ontological databank provides a structured, optimal and relevant set of concepts along with their properties and relations in defined set of categories, pertaining to the domain of interest of the user. Furthermore, ontological databank may be used in scientific research, academic studies, market analysis and so forth. Optionally, ontological databank may include concepts in form of text, image, audio, video, or any combination thereof. Additionally, the ontological databank may provide information on an association of a certain concept in a certain domain with one or more concepts in multiple domains. Specifically, it helps in understanding the inter-relationship between concepts, categories in a specific domain. Beneficially, it helps in organizing large amount of information contained in plurality of data records thereby maintaining an updated ontological databank of the given domain.

Throughout the present disclosure, the term "ontological databank" refers to a databank that defines knowledge pertaining to the utilization of the set of words based on the properties and the relations in the given domain. In other words, ontological databank refers to a repository of established ontological databank between the set of words relating to concepts, categories, and so forth in the given domain based on semantic relations therebetween. Moreover, the semantic relations define at least one of: properties, relations, and utilization associated with the set of words in the domain. In an instance, it is an independent database arrangement.

Optionally, the ontological databank may be a general databank comprising semantic relations between set of words comprised in one or more languages such as English, German, French, and so forth. More optionally, the ontological databank may be a domain specific databank comprising semantic relations associated with the set of words comprised in a specific domain, in a specified language. In an example, the ontological databank may be a data bank comprising semantic relations associated with set of words associated with biomedical, in English language. Optionally, the set of words comprised in the ontological databank are content words. Typically, content words refer to words that describe objects of actuality and qualities associated therewith. Such as, for example, the content words consist of at least one of: nouns, lexical verbs, adjectives, and adverbs. More optionally, the ontological databank may include multi-word expressions such as idiomatic expressions, phrasal verbs, jargon expressions, and other common expressions.

The ontological databank comprises the plurality of concept buckets, wherein the given concept bucket comprises the plurality of concepts that are synonyms of each other. The term "concept bucket" as used herein, refers to a collection of similar terms representing an identical concept therein. Specifically, the concept bucket characterizes the concept by identifying alternate words/phrases and combinations of the same to represent the concepts therein. Typically, the terms in the concept bucket are denoted as alternates to the concept. Notably, it consists of terms closely inter-related and/or inter-dependent to the concept associated by semantic relations established therebetween. Moreover, the concept bucket also includes semantic variations of the concept.

In an embodiment, the ontological databank may comprise a single concept bucket. In another embodiment, the ontological databank may comprise of a plurality of concept buckets. It will be appreciated that the concept bucket consists of synonyms of terms related to the concept. In other words, a word or a phrase having similar or identical meaning as the concept will be included in the bucket. Optionally, it may also comprise metonyms related to the concept namely, words closely identified or commonly used as a substitute for the concept. It will be appreciated that each of the synonym and metonym present in the concept bucket represents plurality of concepts thereof.

In an embodiment, the concept 'Cancer' will have synonyms like 'carcinoma', 'tumor', 'malignancy', and the like in the concept bucket. In another embodiment, the concept 'Disease' will have synonyms like 'infection', 'inflammation', 'flu', 'illness', 'stroke' in the concept bucket.

It will be appreciated that certain concepts may be present in more than one concept buckets, owing to the varying context of the concept. For instance, in one example, the concept 'Drug' may comprise synonyms like 'medicine', 'prescription', 'pill', 'remedy', 'tonic' and the like in the concept bucket. Similarly, the concept 'Drug' may comprise synonyms like 'narcotics', 'poison', 'dope', 'sedate', 'numb' and the like in another concept bucket. In such a case, the coinciding concept is truly identified and mapped with the help of synonyms used in the concept bucket. In the aforementioned example, the concept Drug having synonyms like medicine, pill and the like would be identified as the one used for medication purposes prescribed for treatment of various ailments. However, the concept Drug with synonyms like narcotics, poison and the like would be identified as the substance used illegally for addiction purposes. Notably, keywords in the data records are tagged into concept buckets in such a way that the concept buckets are vast and comprehensive in nature. Furthermore, the keywords are tagged with the synonyms in the concept bucket and are identified therewith. As a result, the search query provided by the user will yield wide collection of relevant data records for the user thereby improving computational efficiency of the ontological databank considerably. Thus, the ontological databank will arrange the plurality of concept buckets in an organized order.

The ontological databank is structured using the structuring arrangement communicably coupled to the ontological databank. The term "structuring arrangement" used herein, refers to one or more individual processors, processing devices and various elements associated with a processing device that may be shared by other processing devices. Additionally, the one or more individual processors, processing devices and elements are arranged in various architectures for responding to and processing the instructions that drive the aforesaid system. Specifically, the structuring arrangement is similar in operation to the processing arrangement. In an instance, the structuring arrangement is a unit of the processing arrangement. In another instance, the structuring arrangement is an independent unit in the system. Notably, the structuring arrangement is coupled to the ontological databank using the communication module. Beneficially, structuring arrangement helps in arranging the plurality of concepts in the ontological databank in a uniform pattern.

The structuring arrangement comprises the classification module operable to classify each of the plurality of concepts in each of the plurality of concept buckets into the specific category or the generic category. Notably, due to vast amount of data records contained in the database arrangement and corresponding plurality of concepts generated therefrom, arranging the plurality of concepts in a uniform pattern is of vital significance. Specifically, the synonyms and metonyms added into the plurality of concept buckets are classified into the specific or generic category by the classification module. Optionally, the classification module classifies the plurality of concepts automatically. Optionally, the classification module permits the user to manually classify the plurality of concepts.

Furthermore, optionally, under automatic classification, the classification module categorizes all direct synonyms of the plurality of concepts in the plurality of concept buckets into the specific category. Optionally, the specific category may also be addressed to as a 'used' category. Typically, the specific category represents terms commonly used as a substitute word/term in other words, the synonyms and/or the metonyms for the plurality of concepts in the plurality of concept buckets. For example, a concept Dimethicone will have synonyms Polydimethylsiloxane (PDMS), dimethylpolysiloxane, etc. classified into the specific category of concepts in the concept bucket.

Similarly, the terms that are unusual or ambiguous substitutes to the plurality of concepts in the plurality of concept buckets are classified into the generic category. Specifically, it denotes that such terms are generic in nature and can be associated with other concepts as well, thus, leading to ambiguity in the concept classification and identification. Optionally, it may also be addressed as an 'unused' category of terms. Typically, the generic category covers uncommon references to the plurality of concepts. In the above example, the concept 'Dimethicone', may also be referred to as 'the first' in certain references to the concept. However, the usage of the term 'the first' does not add a specific understanding to the concept bucket and may be misinterpreted therein. Thus, it is classified into the generic category of concepts in the concept bucket.

Optionally, the concepts in the concept bucket are categorized as generic based on a set of instructions. Additionally, the set of instructions may be identified by the user and communicated to the structuring arrangement via the communication module therebetween. In an embodiment, a synonym may be categorized as generic based on the relevance of the synonym to the concept bucket. Typically, relevance is established using a numerical statistic tool that evaluates the importance of the synonym to a document or a corpus. In an instance, TF-IDF (Term Frequency-Inverse Document Frequency) statistical tool may be used to establish the relevance of the synonym therein. Specifically, it helps in identifying the context of usage of the synonym in a document by comparing the occurrence and use of the synonym in multiple documents. In keeping with the aforementioned example, occurrence of the synonym 'the first' for the concept Dimethicone is compared in Wikipedia literature and Biomedical literature. If the usage is like a common English word without much relevance to the concept then such identified common English words are categorized as generic concepts.

In an embodiment, a synonym may be categorized as generic based on the string length. Specifically, if the string length of the synonym is less than or equal to two (<=2) then the synonym may be identified as one with low relevance and is classified into the generic category. For example, if a term 'da' is identified as a synonym for the concept 'Drug' then it is found to be a string of low relevance as the string length is exactly two, thus, categorized as a generic concept. Furthermore, if the synonym is represented either by a combination of numbers or a combination of special characters alone then the synonym is categorized as a generic concept. For example, if a concept bucket contains '21245' as a synonym for its concept then it will be categorized as a generic category of the concept. Moreover, manual classification is also done by the user to identify generic category of concepts in the plurality of concept buckets.

As mentioned previously, the structuring arrangement comprises the variant module operable to generate lexical variants of the plurality of concepts in the plurality of concept buckets. Specifically, the variant module transforms the plurality of concepts in the plurality of concept buckets to broaden the scope of retrieving data records with possible variations of the concepts. Typically, the ontological databank is a lexical collection of multi-word expressions such as idiomatic expressions, phrasal verbs, jargon expressions, and other common expressions. Thus, the lexical variants of the plurality of concepts pertains to variation in spelling or sound of the word, grammatical behavior of the word and nature of semantic relations of the words with other words within the ontological databank. Therefore, it will be appreciated that the lexical variation of each of the words in the ontological databank comprises records relating to linguistic behavior of each of the words and meaning associated therewith. In an instance, a molecule with a potential antineoplastic activity commonly represented as 'Beigene 283' may also be referred to as 'Beigene-283' or 'Beigene283' in data records. Thus, if such lexical variants are not identified then the plurality of concept buckets will be incomplete and will have limitations in identifying variations within the data records. Hence, the variant module generates lexical variants of the plurality of concepts to retrieve data records that contain variant(s) but not the exact concepts and/or synonyms.

Optionally, the variant module is operable to generate lexical variants for the plurality of concepts having a predefined format. Notably, the variant module will identify distinct format of concepts namely, the concepts having an alpha numeric combination and/or having special characters therein. Furthermore, lexical variation of such concepts would be generated and tagged along with the concept bucket. For instance, in the abovementioned example, the concept 'Beigene 283' has a combination of alphabets and numeric characters separated by a space. Lexical variations of the term will generate 'Beigene283', 'Beigene_283', 'beigene 283', 'Beigene-283' and the like. Thus, expanding accessibility of the search query to retrieve data records thereby.

Optionally, generating variations using the variant module may be done by a rule-based instruction set executed by the structuring arrangement. Additionally, optionally, the rules specified in the rule-based approach may be applicable to all concepts uniformly in the ontological databank. For example, if a concept is alphanumeric where alphabets are separated from the numeric characters by either "-" or " ", a series of steps is performed. Firstly, if the concept contains "-" E.g. abc-123, then a first variation is generated by replacing "-" with space. E.g. abc 123 and a second variation is generated by replacing "-" with blank. E.g. abc123. Secondly, if the concept contains " " E.g. abc 123, then a first variation is generated by replacing " " with "-". E.g. abc-123 and a second variation is generated by replacing " " with blank. E.g. abc123. Specifically, the rule-based approach to generate lexical variations of the plurality of concepts is essential to ensure that no variation is excluded in performing a thorough search for the data records.

Furthermore, the rule-based approach may elaborate unique rules to a class of concepts within the ontological databank. For example, special rules may be applied to a gene entity concept in ontological databank for generating variations therein. In an instance, the rule may be a 3-step process. In the first step, remove all non-alphanumeric characters except Greek characters, +, −, superscript character and subscript character are removed and replaced with blank string. In the second step, remove ":", "_" and space. For example, to retrieve data records for the gene 'HGNC: 286', the concept bucket may already contain variations HGNC:286 and HGNC 286. However, by removing ":", "_" and space HGNC286 will also be added as a variation to the concept bucket. In another example, variation of a gene entity 'NM_000024' is obtained as Nm000024 which will be added to the concept bucket. In the third step, add the terms 'gene' and 'wt allele' as suffix to each of the gene symbols and any other synonym of that gene (with character length <=5), with space in between. E.g. "EGFR gene", "EGFR wt allele". Specifically, for the gene entity concept, additional variants are uniquely created by rules (as described above) for covering small synonyms and to increase the precision of such concepts. Thus, reducing the probability of random matching of irrelevant data records with these concepts.

The structuring arrangement comprises a normalization module operable to determine validity of the plurality of concepts in each of the plurality of concept buckets, and validity of association of a new concept with one of the plurality of concept buckets. As aforementioned, an ontological databank comprising a plurality of concept buckets, wherein a given concept bucket comprises a plurality of concepts that are synonyms of each other. In other words, each of the plurality of concept buckets comprise plurality of concepts that are synonymous to each other. Consequently, the normalization module is operable to determine a validity of such synonymous associations of plurality of concepts in each of the plurality of concept buckets. It will be appreciated that determining or verifying validity of such synonymous associations validates the ontological databank itself, thereby improving reliability thereof. Upon determining the validity of a given concept in a given concept bucket, it is validated whether that given concept is correctly allotted to that given concept bucket. In an example, a given concept bucket may comprise plurality of concepts, such as concepts 'cancer', 'carcinoma', which are synonymous to each other. In such example, the normalization module is operable to determine validity of each of the concepts 'cancer', 'carcinoma' and in the given concept bucket. Moreover, the normalization module is operable to determine validity of association of a new concept with one of the plurality of concept buckets. It will be appreciated that when new concepts are added to the ontological databank, concepts buckets from the plurality of concept buckets are to be determined into which each of the new concepts may be allotted to. Consequently, for a given new concept, a probable concept bucket may be identified with which the given new concept may have a probable association. Subsequently, for the given new concept, the validity of association of the new concept with the probable concept bucket is determined. In an example, a given new concept may be 'tylenol' may be identified, with a probable association to a probable concept bucket comprising concepts 'paracetamol', 'panadol' and 'acetaminophen'. Therefore, in such example, the normalization module is operable to determine the validity of association of the new concept 'tylenol' with the probable concept bucket comprising the concepts 'paracetamol', 'panadol' and 'acetaminophen' is determined.

In an embodiment, the normalization module is operable to determine validity of each of the plurality of concepts in each of the plurality of concept buckets by
  using a first given concept of the plurality of concepts in a given concept bucket as a search query;
  analyzing data records obtained from using the first given concept as the search query to
  determining a first concept trend for the data records obtained for the first given concept;
  using a second given concept from the given concept bucket as a search query;
  analyzing data records obtained from using the second given concept as the search query;
  determining a second concept trend for the data records obtained for the second given concept;
  comparing the first concept trend with respect to the second concept trend to determine the validity of the first given concept.

Optionally, in this regard, the normalization module selects the concept bucket of the plurality of concept bucket for which the validity of concepts is to be determined. Subsequently, from such given concept bucket, a first given concept is selected to determine validity of the synonymous association of such first given concept with other concepts in the given concept bucket. The selected first given concept is used a search query to obtain data records from the database arrangement based thereon. In other words, the data records are retrieved from the database arrangement using the first given concept as the search query. The data records obtained by using the first given concept as the search query are analyzed to obtain a concept trend for the data records associated with the first given concept. It will be appreciated that any particular data record may comprise mentions of several concepts therein. For example, a data record related to an exemplary first given concept 'breast cancer' may comprise concepts such as 'BRCA1', 'cancer', 'mastectomy' and 'chemotherapy'. The concept trend for data records relates to a frequency of occurrence of concepts in data records. Therefore, for the first given concept, the concept trend for the data records related thereto is determined. Similarly, the concept trend for data records obtained using a second given concept as the search query is determined. Subsequently, the first concept trend and the second concept trends are compared. Upon comparison, if the first concept trend and the second concept trend exhibit a substantial similarity between the type of concepts and the frequency of occurrence of those concepts, the first given concept is validated for the given concept bucket.

In an embodiment, the normalization module is operable to determine the validity of association of a new concept with one of the plurality of concept buckets
  using the new concept as a search query;
  analyzing data records obtained from using the new concept as the search query;
  determining a first concept trend for the data records obtained for the new concept;
  identifying a probable concept bucket with which the new concept has a probable association;
  selecting a validated concept from the probable concept bucket and determining a second concept trend for data records obtained from using the validated concepts as a search query;
  comparing the first concept trend with respect to the second concept trend to determine the validity of association of the new concept with the probable concept bucket.

Optionally in this regard, as aforementioned, upon for a given new concept, a probable concept bucket may be identified with which the given new concept may have a probable association. Therefore, using the new concept as a search query for the database arrangement, data records are obtained therefrom relating to the new concept. Subsequently, data records obtained for the new concept are analyzed to obtain a first concept trend there-for. Similarly, from the probable concept bucket, a validated concept is selected. It will be appreciated that the validated concept of a given concept bucket (herein, the probable concept bucket) relates to such concept of the given concept bucket of which the validity of synonymous association to the given concept bucket has been verified. Subsequently, the validated concept is used as a search query for the database arrangement and the second concept trend is determined for the data records resulting therefrom. Subsequently, the first concept trend and the second concept trends are compared. Upon comparison, if the first concept trend and the second concept trend exhibit a substantial similarity between the type of concepts and the frequency of occurrence of those concepts, the first given concept is validated for the given concept bucket.

Optionally, the normalization module is used to disambiguate a context of a concept in a data record stored in the database arrangement. It will be appreciated that a given concept may comprise multiple contexts based on the data record the given concept is used in. For example, the concept 'EGFR' when used in a data record relating to genetics may have a context of 'Epidermal Growth Factor Receptor', whereas when used in a data record relating to kidney function may have a context of 'Estimated Glomerular Filtration Rate'. Therefore, such varying contexts are to be disambiguated for data records. It will be further appreciated that a concept having multiple contexts may be present in more than one concept buckets relating to the varying context. For example, the concept 'EGFR' may be present in concept buckets comprising concepts synonymous to 'Epidermal Growth Factor Receptor' and to 'Estimated Glomerular Filtration Rate'. Hence, such concepts with ambiguous context may be present in multiple concept buckets. Therefore, to disambiguate the context of an ambiguous concept for a data record, the different concepts in such data record are determined. Subsequently, the different concepts derived from such data record are compared with the concepts in the multiple concepts buckets relating to the ambiguous concept. Based on the comparison, the context of the ambiguous concept in the data record is determined. In the aforementioned example, the concept EGFR is present in the two concept buckets, one concept bucket comprising concepts synonymous to 'Epidermal Growth Factor Receptor' and another concept bucket comprising concepts synonymous to 'Estimated Glomerular Filtration Rate'. Therefore, for a given data record comprising EGFR as a concept, the other concepts in the data record are derived. Subsequently, such concepts, for example may be 'gene', 'receptor' and 'Epidermal Growth Factor Receptor'. Upon comparison of the derived concept with the two concepts buckets, it may be disambiguated that in the data record, the context of the concept 'EGFR' is 'Epidermal Growth Factor Receptor'. It will be appreciated that the disambiguation of context of the concepts in the search query assists the user in retrieving results relevant thereto.

Optionally, the processing arrangement is operable to process the search query by analyzing the search query to determine at least one concept associated therewith. Specifically, the search query is analyzed using techniques like, parsing, comparing etc. in order to identify contextual meaning thereof. Typically, the processing arrangement analyses the search query to interpret it. Furthermore, after analyzing, the processing arrangement determines at least one concept associated with the search query. Optionally, the search query may have one or more keywords included therein associated with at least one concept. In an instance, if the search query received by the processing arrangement is 'pathogenesis and tumor drug-resistant mechanisms for breast cancer stem cells.' In such a case, the keywords identified are 'breast cancer', 'pathogenesis', 'stem cells' which may be broadly associated with a concept of 'Cancer'.

Optionally, the processing arrangement is operable to process the search query by determining, from the plurality of concept buckets, in the ontological databank the concept bucket for the at least one concept in the search query. Specifically, after identifying the at least one concept in the search query, it is associated to the at least one concept bucket. Optionally, the concepts in the search query may be associated with a plurality of concept buckets.

Optionally, the processing arrangement is operable to determine the category of the at least one concept in the search query, from the concept bucket. Specifically, the concept may be classified as specific category. Alternatively, the concept may be classified into generic category. It will be appreciated that the category of the concept helps in determining its relevance thereby. Thus, enabling the processing arrangement to efficiently retrieve data records associated to the relevant concepts while omitting the data records tagged to irrelevant concepts.

Beneficially, such categorization of the concepts makes retrieving data records convenient and productive for the user. As a result of the classification, relevant data records are efficiently retrieved based on the search query provided therein. In an instance, if a concept 'A' is in concept bucket having specific concepts A, B, and a generic concept C. Thereupon, if a user enters a search query for the concept A, the data records retrieved will comprise of records for both the specific concepts A and B. Similarly, if the user enters a search query for the concept B, the data records retrieved will comprise of records for both the specific concepts A and B. However, if the user enters a search query for C, the user will be prompted to select the desired data record therein. In other words, the user will be prompted to direct the search query results to either the specific concepts category (A, B) or the generic concepts category (C). If the user selects the specific concept A (or B) then, the data records retrieved will comprise of records for both the specific concepts A and B. Furthermore, if the user selects the generic concept C then, the data records pertaining to C will be retrieved.

Optionally, the processing arrangement is operable to process the search query by associating synonyms and variants of the at least one concept using the concept bucket thereof based on the determined category. Specifically, the variants and synonyms of the at least one concept is generated. It ensures that a common and/or unique variation of the concept in data records is substantially covered therebetween.

The processing arrangement is operable to retrieve data records from the database arrangement based on the processed search query. Specifically, the data records closely representing the search query are retrieved from the database arrangement. Furthermore, the data record comprises the concepts, categories, synonyms and variations extracted from the search query. Optionally, the database arrangement may provide at least one data record for the search query. Optionally, the database arrangement may provide a plurality of data records for the search query. Additionally, the communication module enables exchange of data records between the processing arrangement and the database arrangement. Optionally, similar data records may be relevant for multiple search queries by the user. However, similar search queries may not retrieve different data records from the database arrangement. The processing arrangement is operable to provide the retrieved data records on the computing device. Specifically, the computing device displays one or more data records. Optionally, the computing device is an integrated device with the processing arrangement. Optionally, the computing device is an independent unit.

Optionally, the method further comprises:
using a first given concept of the plurality of concepts in a given concept bucket as a search query;
analyzing data records obtained from using the first given concept as the search query;
determining a first concept trend for the data records obtained for the first given concept;
using a second given concept from the given concept bucket as a search query;
analyzing data records obtained from using the second given concept as the search query;
determining a second concept trend for the data records obtained for the second given concept; and
comparing the first concept trend with respect to the second concept trend to determine the validity of the first given concept.

Optionally, the method further comprises:
using the new concept as a search query;
analyzing data records obtained from using the new concept as the search query;
determining a first concept trend for the data records obtained for the new concept;
identifying a probable concept bucket with which the new concept has a probable association;
selecting a validated concept from the probable concept bucket and determining a second concept trend for data records obtained from using the validated concepts as a search query; and
comparing the first concept trend with respect to the second concept trend to determine the validity of association of the new concept with the probable concept bucket.

Optionally, the normalization module is operable to disambiguate a context of a concept in a data record stored in the database arrangement.

Optionally, the variants module is operable to generate lexical variants for concepts having a predefined format.

Optionally, the search query is received from a computing device associated with a user.

The present disclosure further provides a computer program product comprising non-transitory computer-readable storage media having computer-readable instructions stored thereon, the computer-readable instructions being executable by a computerized device comprising processing hardware to execute a method of for retrieving data records from a database arrangement based on a search query.

DETAILED DESCRIPTION OF THE DRAWINGS

Referring to FIG. 1, there is shown a schematic illustration of a system 100 for retrieving data records from a database arrangement 102 based on a search query, in accordance with an embodiment of the present disclosure. The system 100 comprises a database arrangement 102, an ontological databank 104, a processing arrangement 106 and a communicating device 108.

The ontological databank 104 comprises a plurality of concept buckets 110, wherein a given concept bucket 110 comprises a plurality of concepts that are synonyms of each other. Moreover, the ontological databank 104 is structured using a structuring arrangement 112 communicably coupled to the ontological databank 104. Further, the structuring arrangement 112 comprises a classification module 114, a variant module 116 and a normalization module 118. The classification module 114 is operable to classify each of the plurality of concepts in each of the plurality of concept buckets 110 into a specific category or a generic category. The variant module 116 is operable to generate lexical variants of a plurality of concepts in the plurality of concept buckets 110. The normalization module 118 is operable to determine validity of the plurality of concepts in each of the plurality of concept buckets 110, and validity of association of a new concept with one of the plurality of concept buckets 110.

The processing arrangement 106 is communicably coupled to the database arrangement 102 and the ontological databank 104. The processing arrangement 106 is operable to receive a search query, process the search query based on the ontological databank 104, retrieve data records from the database arrangement 102 based on the processed search query and provide the retrieved data records on the computing device 108.

FIG. 1 is merely an example, which should not unduly limit the scope of the claims herein. It is to be understood that the simplified illustration of the system 100 for retrieving data records from the database arrangement 102 based on a search query is provided as an example and is not to be construed as limiting the system 100 to specific numbers, types, or arrangements of the computing device and processing arrangement. A person skilled in the art will recognize many variations, alternatives, and modifications of embodiments of the present disclosure.

Figure 2:
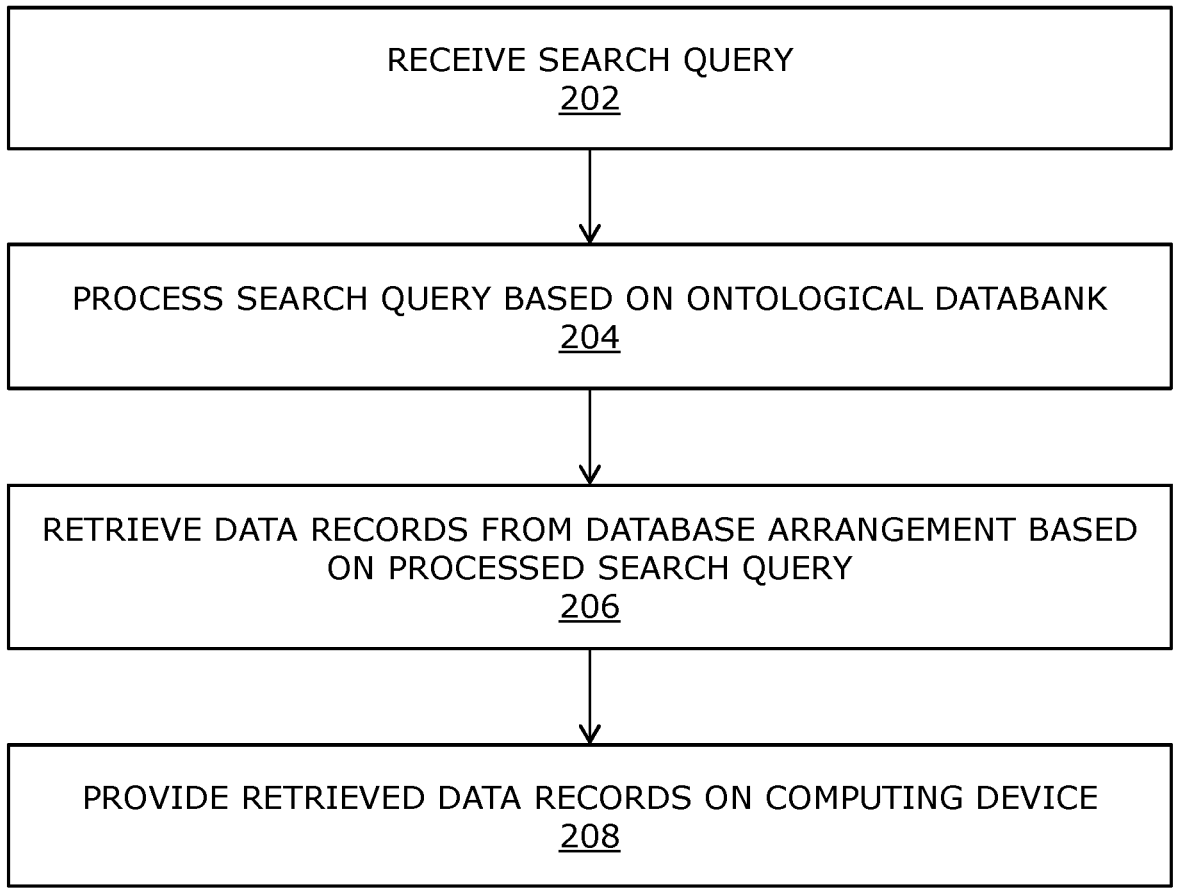
FIG. 2 is a flow chart depicting steps of a method for retrieving data records from a database arrangement based on a search query, in accordance with an embodiment of the present disclosure.

Referring to FIG. 2, there is shown a flow chart depicting steps of a method for retrieving data records from a database arrangement based on a search query, in accordance with an embodiment of the present disclosure. The method is depicted as a collection of steps in a logical flow diagram, which represents a sequence of steps that can be implemented in hardware, software, or a combination thereof, for example as aforementioned.

The method for creating the database query from the user search query is implemented via a system comprising a database arrangement, an ontological databank, a processing arrangement and a communicating device. The ontological databank comprises a plurality of concept buckets, wherein a given concept bucket comprises a plurality of concepts that are synonyms of each other. The ontological databank is structured using a structuring arrangement communicably coupled to the ontological databank. Further, the structuring arrangement comprises a classification module, a variant module and a normalization module. The classification module is operable to classify each of the plurality of concepts in each of the plurality of concept buckets into a specific category or a generic category. The variant module is operable to generate lexical variants of a plurality of concepts in the plurality of concept buckets. The normalization module is operable to determine validity of the plurality of concepts in each of the plurality of concept buckets, and validity of association of a new concept with one of the plurality of concept buckets.

At a step 202, a search query is received. At a step 204, the search query is processed based on the ontological databank. At a step 206, data records are retrieved from the database arrangement based on the processed search query. At a step 208, the retrieved data records are provided on a computing device.

The steps 202, 204, 206 and 208 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for retrieving data records from a database arrangement based on a search query, the database arrangement comprising a plurality of data records, wherein each of the plurality of data records is associated with at least one concept, the system comprising:
   an ontological databank comprising a plurality of concept buckets, wherein a given concept bucket comprises a plurality of concepts that are synonyms of each other, wherein the ontological databank is structured using a structuring arrangement communicably coupled to the ontological databank, the structuring arrangement comprising:
      a classification module operable to classify the each of the plurality of concepts in each of the plurality of concept buckets into a specific category or a generic category;
      a variant module operable to generate lexical variants of a plurality of concepts in the plurality of concept buckets;
      a normalization module operable to determine validity of the plurality of concepts in each of the plurality of concept buckets, and validity of association of a new concept with one of the plurality of concept buckets;
   a processing arrangement communicably coupled to the database arrangement and the ontological databank, the processing arrangement operable to:
      receive a search query;
      process the search query based on the ontological databank, wherein the processing arrangement is configured to process the search query by:

analyzing the search query to determine at least one concept associated therewith;

determining from the plurality of concept buckets in the ontological databank, the concept bucket for the at least one concept in the search query;

determining a category of the at least one concept from the concept bucket for the at least one concept, using the classification module in the ontological databank; and associating synonyms and variants of the at least one concept using the concept bucket thereof based on the determined category;

retrieve data records from the database arrangement based on the processed search query; and provide the retrieved data records on a computing device.

2. The system of claim 1, wherein the normalization module is operable to determine validity of each of the plurality of concepts in each of the plurality of concept buckets by:

using a first given concept of the plurality of concepts in a given concept bucket as a search query;

analyzing data records obtained from using the first given concept as the search query;

determining a first concept trend for the data records obtained for the first given concept;

using a second given concept from the given concept bucket as a search query;

analyzing data records obtained from using the second given concept as the search query;

determining a second concept trend for the data records obtained for the second given concept;

comparing the first concept trend with respect to the second concept trend to determine the validity of the first given concept.

3. The system of claim 1, wherein the normalization module is operable to determine the validity of association of a new concept with one of the plurality of concept buckets:

using the new concept as a search query;

analyzing data records obtained from using the new concept as the search query;

determining a first concept trend for the data records obtained for the new concept;

identifying a probable concept bucket with which the new concept has a probable association;

selecting a validated concept from the probable concept bucket and determining a second concept trend for data records obtained from using the validated concepts as a search query;

comparing the first concept trend with respect to the second concept trend to determine the validity of association of the new concept with the probable concept bucket.

4. The system of claim 1, wherein the normalization module is operable to disambiguate a context of a concept in a data record stored in the database arrangement.

5. The system of claim 1, wherein the variants module is operable to generate lexical variants for concepts having a predefined format.

6. The system of claim 1, wherein the search query is received from a computing device associated with a user.

7. A method for retrieving data records from a database arrangement based on a search query, the database arrangement comprising a plurality of data records, wherein each of the plurality of data records is associated with at least one concept, wherein the method is implemented using a system comprising:

an ontological databank comprising a plurality of concept buckets, wherein a given concept bucket comprises a plurality of concepts that are synonyms of each other, wherein the ontological databank is structured using a structuring arrangement communicably coupled to the ontological databank, the structuring arrangement comprising:

a classification module operable to classify the each of the plurality of concepts in each of the plurality of concept buckets into a specific category or a generic category;

a variant module operable to generate lexical variants of a plurality of concepts in the plurality of concept buckets;

a normalization module operable to determine validity of the plurality of concepts in each of the plurality of concept buckets, and validity of association of a new concept with one of the plurality of concept buckets;

a processing arrangement communicably coupled to the database arrangement and the ontological databank;

wherein the method comprises:

receiving a search query;

processing the search query based on the ontological databank, wherein the processing arrangement is configured to process the search query by:

analyzing the search query to determine at least one concept associated therewith;

determining, from the plurality of concept buckets in the ontological databank, the concept bucket for the least one concept in the search query;

determining a category of the at least one concept from the concept bucket for the at least one concept, using the classification module in the ontological databank; and associating synonyms and variants of the at least one concept using the concept bucket thereof based on the determined category;

retrieving data records from the database arrangement based on the processed search query; and providing the retrieved data records on a computing device.

8. The method of claim 7, wherein the method further comprises:

using a first given concept of the plurality of concepts in a given concept bucket as a search query;

analyzing data records obtained from using the first given concept as the search query;

determining a first concept trend for the data records obtained for the first given concept;

using a second given concept from the given concept bucket as a search query;

analyzing data records obtained from using the second given concept as the search query;

determining a second concept trend for the data records obtained for the second given concept; and comparing the first concept trend with respect to the second concept trend to determine the validity of the first given concept.

9. The method of claim 7, wherein the method further comprises:

using the new concept as a search query;

analyzing data records obtained from using the new concept as the search query;

determining a first concept trend for the data records obtained for the new concept;

identifying a probable concept bucket with which the new concept has a probable association;

selecting a validated concept from the probable concept bucket and determining a second concept trend for data records obtained from using the validated concepts as a search query; and comparing the first concept trend with respect to the second concept trend to determine the validity of association of the new concept with the probable concept bucket.

10. The method of claim 7, wherein the normalization module is operable to disambiguate a context of a concept in a data record stored in the database arrangement.

11. The method of claim 7, wherein the variants module is operable to generate lexical variants for concepts having a predefined format.

12. The method of claim 7, wherein the search query is received from a computing device associated with a user.

13. A computer program product comprising non-transitory computer-readable storage media having computer-readable instructions stored thereon, the computer-readable instructions being executable by a computerized device comprising processing hardware to execute a method of claim 7.

* * * * *